US011873357B2

(12) United States Patent
Chernysheva et al.

(10) Patent No.: US 11,873,357 B2
(45) Date of Patent: Jan. 16, 2024

(54) FLUOROELASTOMER CURABLE COMPOSITION

(71) Applicant: SOLVAY SPECIALTY POLYMERS ITALY S.P.A., Bollate (IT)

(72) Inventors: Liubov Chernysheva, Milan (IT); Lidia Maria Baiguera, Arese (IT); Mattia Bassi, Milan (IT); Nicola Ranieri, Monza (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 390 days.

(21) Appl. No.: 16/967,665

(22) PCT Filed: Feb. 4, 2019

(86) PCT No.: PCT/EP2019/052679
§ 371 (c)(1),
(2) Date: Aug. 5, 2020

(87) PCT Pub. No.: WO2019/154765
PCT Pub. Date: Aug. 15, 2019

(65) Prior Publication Data
US 2021/0230327 A1 Jul. 29, 2021

(30) Foreign Application Priority Data
Feb. 9, 2018 (EP) .................................... 18156108

(51) Int. Cl.
| | |
|---|---|
| C08F 214/22 | (2006.01) |
| C08F 214/16 | (2006.01) |
| C08F 214/26 | (2006.01) |
| C08F 214/28 | (2006.01) |
| C08J 3/28 | (2006.01) |
| C08K 5/132 | (2006.01) |
| C08K 5/3492 | (2006.01) |
| C08K 5/5313 | (2006.01) |
| C08L 27/12 | (2006.01) |
| C08F 2/38 | (2006.01) |
| C08F 2/50 | (2006.01) |

(52) U.S. Cl.
CPC .............. *C08F 214/22* (2013.01); *C08F 2/38* (2013.01); *C08F 2/50* (2013.01); *C08F 214/16* (2013.01); *C08F 214/26* (2013.01); *C08F 214/28* (2013.01); *C08J 3/28* (2013.01); *C08K 5/132* (2013.01); *C08K 5/34924* (2013.01); *C08K 5/5313* (2013.01); *C08L 27/12* (2013.01)

(58) Field of Classification Search
CPC combination set(s) only.
See application file for complete search history.

(56) References Cited

U.S. PATENT DOCUMENTS

| | | | |
|---|---|---|---|
| 4,243,770 A | 1/1981 | Tatemoto et al. | |
| 4,564,662 A | 1/1986 | Albin | |
| 4,943,622 A | 7/1990 | Naraki et al. | |
| 5,173,553 A | 12/1992 | Albano et al. | |
| 6,346,300 B1 * | 2/2002 | Ruepping | C08F 255/02 427/520 |
| 6,803,391 B2 | 10/2004 | Paglia et al. | |
| 6,974,845 B1 * | 12/2005 | Minamino | C08J 3/28 525/305 |
| 11,248,117 B2 * | 2/2022 | Jiang | C08F 214/22 |
| 2008/0032052 A1 * | 2/2008 | Kourtakis | G02B 1/118 524/493 |
| 2009/0306303 A1 * | 12/2009 | Schmiegel | C08K 5/55 525/326.3 |
| 2013/0158154 A1 * | 6/2013 | Lyons | C08K 5/0025 525/370 |
| 2019/0033620 A1 * | 1/2019 | Yahagi | G02B 5/3016 |

FOREIGN PATENT DOCUMENTS

| | | | | |
|---|---|---|---|---|
| EP | 199138 A2 | 10/1986 | | |
| EP | 1227134 A1 | 7/2002 | | |
| EP | 1700884 A1 * | 9/2006 | ........... | C08K 5/0025 |
| WO | 9502634 A1 | 1/1995 | | |
| WO | 2008019078 A1 | 2/2008 | | |
| WO | 2017058699 A1 | 4/2017 | | |
| WO | WO-2017175829 A1 * | 10/2017 | ............... | B32B 7/02 |

\* cited by examiner

*Primary Examiner* — Nicole M. Buie-Hatcher
(74) *Attorney, Agent, or Firm* — Osha Bergman Watanabe & Burton LLP

(57) ABSTRACT

The invention pertains to UV-curable compositions comprising a iodine-containing (per)fluoroelastomer, and well-defined amount of certain combinations of given photoinitiators and crosslinking which are particularly effective in delivering through low temperature UV curing crosslinked parts possessing outstanding mechanical properties.

14 Claims, No Drawings

FLUOROELASTOMER CURABLE COMPOSITION

CROSS-REFERENCE TO RELATED APPLICATION

This application is a U.S. national stage entry under 35 U.S.C. § 371 of International Application No. PCT/EP2019/052679 filed Feb. 4, 2019, which claims priority to European application No. EP 18156108.5, filed on Feb. 9, 2018. The entire contents of these applications are explicitly incorporated herein by this reference.

TECHNICAL FIELD

The invention pertains to certain fluoroelastomer compositions having ability to crosslink at low temperature, to a process for their manufacture, to a method of curing the same and to shaped cured articles therefrom.

BACKGROUND ART

Vulcanized (per)fluoroelastomers are materials with excellent heat-resistance and chemical-resistance characteristics, which are generally used in the manufacture of sealing articles such as oil seals, gaskets, shaft seals and O-rings in which the leaktightness, the mechanical properties and the resistance to substances such as mineral oils, hydraulic fluids, solvents or chemical agents of diverse nature must be ensured over a wide range of working temperatures, from low to high temperatures, and wherein materials might be called to comply with severe requirements in terms of purity, plasma resistance and particles release.

Nevertheless, for a (per)fluoroelastomer to express these peculiar properties and advantages, quite drastic curing conditions have to be applied to transform sticky rubbery or even viscous fluororubber precursor into cured or vulcanized materials.

While it is common for rubbers such as nitrile rubbers, silicone rubbers, acrylic rubbers, to be cured at high temperatures, it is generally acknowledged that curing temperatures for (per)fluoroelastomers are generally higher than curing temperatures for non-fluorocarbon elastomers, and generally range from about 160° C. to about 180° C. or even beyond.

Because of the high temperatures required to cure (per) fluoroelastomers, compounds containing (per)fluoroelastomers are difficult to mold or process with other plastics or other types of elastomers, e.g. in multiple-shots molding processes, and "cure-in-place" techniques are difficult to be applied.

Actually, in techniques of assembling automobile engines and related mechanical components such as oil pans and transmissions, silicone sealing materials known as liquid gaskets are used around flanges for preventing gas and oil leakage there through. The liquid gasket material is generally applied in bead form to one of mating surfaces to be sealed, using an applicator robot. Before or after curing, the bead is pressed between mating surfaces to form a gasket in place. The gasket sealing system so obtained is generally referred to as a formed-in-place gasket (FIPG). FIPG is utilized in many industrial fields as well as the automotive industry since it contributes to energy saving, resource saving, reduction of part size and weight, and reduction of process steps. For a rubber material to be compatible with processing requirements for FIPG, low curing temperature and high curing speed are certainly key, together with the ability of providing gaskets possessing heat and chemical resistance, such as resistance to engine oil, gear oil, transmission oil or LLC, depending on the area where they are used. While from performances' perspective, (per)fluoroelastomers are certainly excellent candidates, there's a present shortfall in their ability of being processed and cured in a manner as easy as achievable with silicone-based sealants.

Under these circumstances, attempts have already been made in the art to provide solutions for effecting curing of (per)fluoroelastomers at lower temperatures using UV radiation. U.S. Pat. No. 6,803,391 (DUPONT DOW ELASTOMERS LLC) 12 Oct. 2004 discloses compositions which are curable by the action of UV radiation, and which are thermally stable in processing conditions, which are made of a fluoroelastomer possessing cure sites, such as iodine, chlorine or bromine-containing groups, a multifunctional crosslinking agent, and a UV initiator; this document teaches that it is preferable to use between 0.5 to 2.5 weight percent, most preferably 0.5 to 1.0 weight percent of UV initiator, because high levels of photoinitiator tend to interfere with penetration and do not substantially contribute to the overall crosslinking density. Working embodiments of this document provide for fluoroelastomer compounds based on bromine-containing fluoroelastomer, trimethylolpropane triacrylate as crosslinking agent, and 0.5 weight parts of a mixture of 1-hydroxycyclohexyl phenyl ketone and bis(2,6-dimethoxybenzoyl)-2,4,4-trimethylphenylphosphine oxide (commercially available as IRGACURE® photoinitiator). While the mechanical properties of the cured materials resulting thereof are somewhat failing, these compounds suffer of colouring issues, due to the presence of bromine; further, because of the use of acrylate-based crosslinking agent, the presence of such acrylic groups is such to expose the cured material to thermal degradation issues.

Further, U.S. Pat. No. 6,974,845 (DAIKIN INDUSTRIES, LTD.) 13 Dec. 2005 discloses an ultraviolet-crosslinkable polymer composition comprising a fluoroelastomer having iodine groups, a photoinitiator and a polyfunctional unsaturated compound. Working embodiments of this document are notably representative of compounds whereas iodine-containing fluoroelastomers were compounded with a photoinitiator selected from the group consisting of 1-hydroxycyclohexyl phenylketone, 2,2-dimethoxy-2-phenylacetone, and benzophenone, a polyfunctional unsaturated compound selected from trimethylolpropane triacylate and triallylisocyanurate; all these compounds, once cured by UV radiation, gave rise to cured parts possessing low strength at 100% elongation, and possessing very large elongation at break, i.e. possessing poor mechanical properties.

WO 2008/019078 (DUPONT DE NEMOURS) 14 Feb. 2008 pertains to low refractive index compositions having utility as anti-reflective coatings for optical display substrates, which are the reaction products of fluoroelastomer, crosslinker, oxysilane, initiator and solid nanosilica.

Now, there's still a shortfall in the art for fluoroelastomer compounds possessing ability to be cured at low temperatures under UV radiation, which will deliver cured parts possessing improved mechanical properties, including notably tensile strength of exceeding 5 MPa and simultaneously elongations at break of between about 150 and 300%.

The present invention provides compositions of (per) fluoroelastomers that can be quickly cured at low temperatures under UV radiation, without compromising mechanical properties of articles derived from these compositions. These (per)fluoroelastomers may also exhibit low viscosities, which can be useful in milling and molding applications and cure in place applications. The presently disclosed compositions may also include one or more conventional adjuvants, such as, for example, fillers, acid acceptors, process aids, or colorants.

SUMMARY OF INVENTION

The Applicant has now found that certain UV-curable compositions comprising a iodine-containing (per)fluoroelastomer, and well-defined amount of certain combinations of given photoinitiators and crosslinking agents can solve above mentioned problems and are particularly effective in delivering through low temperature UV curing crosslinked parts possessing outstanding mechanical properties.

The invention hence pertains to a composition [composition (C)] comprising:

at least one (per)fluoroelastomer comprising iodine cure sites [fluoroelastomer (A)];
at least one photoinitiator [initiator (P)] of formula:

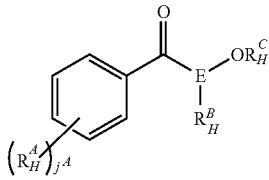

wherein:
each of $R^A_H$, equal to or different from each other, is a $C_1$-$C_{12}$ hydrocarbon group, containing possibly one or more than one heteroatom, in particular selected from the group consisting of oxygen, nitrogen, sulfur;
$j^A$ is zero or is an integer of 1 to 3;
E is either a trivalent =P(=O)— group or a trivalent =C($R^O_H$)— group, with $R^D_H$ being a methyl group or an ethyl group;
$R^B_H$ is a phenyl, a methyl group or an ethyl group, with the proviso that when E is =C($R^C_H$)—, then $R^B_H$ is a methyl group or an ethyl group;
$R^C_H$ is a hydrogen atom or is selected from a methyl group and an ethyl group; and
said initiator (P) being present in an amount of 4.0 to 15.0 phr, based on fluoroelastomer (A);
and
at least one polyunsaturated compound [compound (U)] selected from (U-1) tri-substituted isocyanurate compounds of general formula:

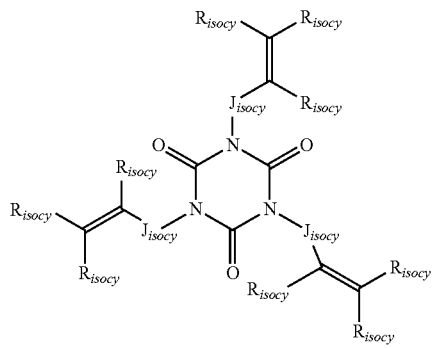

wherein each of $R_{isocy}$, equal to or different from each other and at each occurrence, is independently selected from H or a group —$R_{risocy}$ or —$OR_{risocy}$, with $R_{risocy}$ being $C_1$-$C_5$ alkyl, possibly comprising halogen(s), and each of $J_{isocy}$, equal to or different from each other and at each occurrence, is independently selected from a bond or a divalent hydrocarbon group, optionally comprising heteroatoms, and (U-2) tri-substituted cyanurate compounds of general formula:

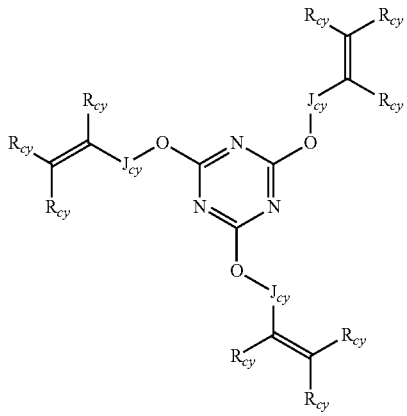

wherein each of $R_{cy}$, equal to or different from each other and at each occurrence, is independently selected from H or a group —$R_{rcy}$ or —$OR_{rcy}$, with $R_{rcy}$ being $C_1$-$C_5$ alkyl, possibly comprising halogen(s), and each of $J_{cy}$, equal to or different from each other and at each occurrence, is independently selected from a bond or a divalent hydrocarbon group, optionally comprising heteroatoms; said compound (U) being present in an amount of 2.5 to 15.0 phr, based on fluoroelastomer (A).

The Applicant has surprisingly found that the combination of above detailed amounts of the peculiar compounds mentioned above, i.e. an isocyanurate-based polyunsaturated compound and a photoinitiator leading to homolytic cleavage and formation notably of highly reactive short-chain substituted $(R^B_H)(R^D_H)C(OR^C_H)$·carbon radical or highly reactive phosphorous-based $(R^B_H)P(=O)(OR^C_H)$·radical, is such to provide for curable blend which, upon UV exposure, delivers crosslinked parts with high crosslinking density (XL fraction of more than 85%, upon UV exposure), high modulus at 100% elongation (typically equal to or exceeding 4 MPa) and appropriate elongation at break (typically of at least 150% and at most 300%). Further, the use of polyunsaturated compounds (U), as detailed above, comprising a thermally highly stable cyanurate or isocyanurate ring, is such to ensure good coloring in final parts, with no degradation/discoloring phenomena.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Generally fluoroelastomer (A) comprises recurring units derived from at least one (per)fluorinated monomer, wherein said (per)fluorinated monomer is generally selected from the group consisting of:

- $C_2$-$C_8$ fluoro- and/or perfluoroolefins, such as tetrafluoroethylene (TFE), hexafluoropropene (HFP), pentafluoropropylene, and hexafluoroisobutylene;
- $C_2$-$C_8$ hydrogenated monofluoroolefins, such as vinyl fluoride; 1,2-difluoroethylene, vinylidene fluoride (VDF) and trifluoroethylene (TrFE);
- (per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
- chloro- and/or bromo- and/or iodo-$C_2$-$C_6$ fluoroolefins, like chlorotrifluoroethylene (CTFE);
- fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;
- hydrofluoroalkylvinylethers complying with formula $CH_2=CFOR_{f1}$ in which $R_{f1}$ is a $C_1$-$C_6$ fluoro- or perfluoroalkyl, e.g. $-CF_3$, $-C_2F_5$, $-C_3F_7$;
- fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups; in particular (per)fluoro-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;
- functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;
- (per)fluorodioxoles, of formula:

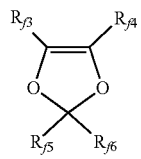

wherein each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

Examples of hydrogenated monomers are notably hydrogenated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluoroelastomer (A) is preferably selected among:
(1) VDF-based copolymers, in which VDF is copolymerized with at least one additional comonomer selected from the group consisting of:
  (a) $C_2$-$C_8$ perfluoroolefins, such as tetrafluoroethylene (TFE), hexafluoropropylene (HFP);
  (b) hydrogen-containing $C_2$-$C_8$ olefins, such as vinyl fluoride (VF), trifluoroethylene (TrFE), hexafluoroisobutene (HFIB), perfluoroalkyl ethylenes of formula $CH_2=CH-R_f$, wherein $R_f$ is a $C_1$-$C_6$ perfluoroalkyl group;
  (c) $C_2$-$C_8$ fluoroolefins comprising at least one of iodine, chlorine and bromine, such as chlorotrifluoroethylene (CTFE);
  (d) (per)fluoroalkylvinylethers (PAVE) of formula $CF_2=CFOR_f$, wherein $R_f$ is a $C_1$-$C_6$ (per)fluoroalkyl group, preferably $CF_3$, $C_2F_5$, $C_3F_7$;
  (e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;
  (f) (per)fluorodioxoles having formula:

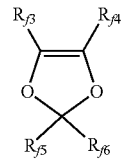

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;
  (g) (per)fluoro-methoxy-vinylethers (MOVE, hereinafter) having formula: $CF_2=CFOCF_2OR_{f2}$
wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom; $R_{f2}$ is preferably $-CF_2CF_3$ (MOVE1); $-CF_2CF_2OCF_3$ (MOVE2); or $-CF_3$ (MOVE3);
  (h) $C_2$-$C_8$ non-fluorinated olefins (OI), for example ethylene and propylene; and
(2) TFE-based copolymers, in which TFE is copolymerized with at least one additional comonomer selected from the group consisting of (c), (d), (e), (g), (h) and (i) as above detailed.

Optionally, fluoroelastomer (A) of the present invention may also comprises recurring units derived from a bis-olefin [bis-olefin (OF)] having general formula:

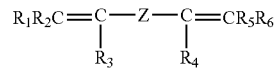

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ (hydro)carbon radical (including alkylene or cycloalkylene radical), optionally containing oxygen atoms, preferably at least partially fluorinated, or a (per)fluoro(poly)oxyalkylene radical comprising one or more catenary ethereal bonds.

The bis-olefin (OF) is preferably selected from the group consisting of those complying with formulae (OF-1), (OF-2) and (OF-3):

(OF-1)

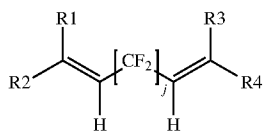

wherein j is an integer between 2 and 10, preferably between 4 and 8, and R1, R2, R3, R4, equal or different from each other, are H, F or C1-5 alkyl or (per)fluoroalkyl group;

(OF-2)

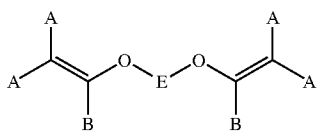

wherein each of A, equal or different from each other and at each occurrence, is independently selected from F, Cl, and H; each of B, equal or different from each other and at each occurrence, is independently selected from F, Cl, H and ORB, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

(OF-3)

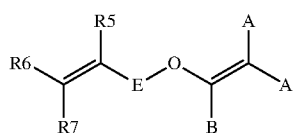

wherein E, A and B have the same meaning as above defined; $R_5$, $R_6$, $R_7$, equal or different from each other, are H, F or $C_{1-5}$ alkyl or (per)fluoroalkyl group.

According to certain preferred embodiments, the fluoroelastomer (A) has a number-averaged molecular weight of advantageously at least 3 000 and/or of advantageously at most 45 000.

The use of a fluoroelastomer (A) possessing the above recited molecular weight, and hence a low viscosity, makes the composition (C) particularly adapted for being processed through liquid injection molding, screen-printing and/or form-in-place techniques. The challenge of the use of these techniques is indeed to simultaneously achieve a suitable low liquid viscosity of the fluoroelastomer (A), to advantageously ensure appropriate flow of the material in the mould, during the roll coating and/or in the dispenser noozle, while still ensuring outstanding curing capabilities, so as to provide for finished article having required mechanical and sealing properties at reasonable throughput rate and in reasonably mild processing conditions.

The number average molecular weight ($M_n$) is defined mathematically as:

$$M_n = \frac{\sum M_i \cdot N_i}{\sum N_i},$$

wherein $N_i$ is the number of moles of chains possessing length $M_i$; number average molecular weight is generally determined by GPC, using tetrahydrofuran (THF) as eluent against monodisperse polystyrene standards.

Other molecular parameters which can be notably determined by GPC are the weight average molecular weight ($M_w$):

$$M_w = \frac{\sum M_i^2 \cdot N_i}{\sum M_i \cdot N_i},$$

and
the polydispersity index (PDI), which is hereby expressed as the ratio of weight average molecular weight ($M_w$) to number average molecular weight ($M_n$).

The fluoroelastomer (A) of this embodiment has a number-averaged molecular weight of preferably at least 5 000, more preferably at least 6 000, even more preferably at least 10 000.

The fluoroelastomer (A) of this embodiment has a number-averaged molecular weight of preferably at most 40 000, more preferably at most 35 000, even more preferably at most 30 000.

According to other preferred embodiments, the fluoroelastomer (A) has a number-averaged molecular weight of beyond 45 000, preferably of between 50 000 to 500 000. Fluoroelastomers of this type can be processed by general-purpose techniques, and/or can be combined with solvents or plasticizers for facilitating flow.

As said, fluoroelastomer (A) comprises iodine cure sites.

Generally, the amount of iodine and/or bromine cure site is such that the iodine content is of from 0.04 to 10.0% wt, with respect to the total weight of fluoroelastomer (A).

These iodine cure sites might be comprised as pending groups bound to the backbone of the fluoroelastomer (A) polymer chain or might be comprised as terminal groups of said polymer chain.

According to a first embodiment, the iodine cure sites are comprised as pending groups bound to the backbone of the fluoroelastomer (A) polymer chain; the fluoroelastomer (A) according to this embodiment typically comprises recurring units derived from brominated and/or iodinated cure-site comonomers selected from:
  iodo alpha-olefins containing from 2 to 10 carbon;
  iodo fluoroalkyl vinyl ethers (as notably described in U.S. Pat. Nos. 454,662, 4,564,662 (MINNESOTA MINING) 14 Jan. 1986 and EP 199138 A (DAIKIN IND LTD) 29 Oct. 1986).

According to a second preferred embodiment, the iodine cure sites are comprised as terminal groups of the fluoroelastomer (A) polymer chain; the fluoroelastomer according to this embodiment is generally obtained by addition to the polymerization medium during fluoroelastomer (A) manufacture of at least one of:
  iodinated chain-transfer agent(s); suitable chain-transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) Jun. 1, 1981 and U.S. Pat. No. 4,943,622 (NIPPON MEKTRON KK) 24 Jul. 1990); and alkali metal or alkaline-earth metal iodides, such as described notably in U.S. Pat. No. 5,173,553 (AUSIMONT SRL) 22 Dec. 1992.

Advantageously, for ensuring acceptable reactivity it is generally understood that the content of iodine in the fluoroelastomer (A) should be of at least 0.05% wt, preferably of at least 0.06% weight, with respect to the total weight of fluoroelastomer (A).

On the other side, amounts of iodine not exceeding preferably 7% wt, more specifically not exceeding 5% wt, or even not exceeding 4% wt, with respect to the total weight of fluoroelastomer (A), are those generally selected for avoiding side reactions and/or detrimental effects on thermal stability.

The composition (C) may comprise one or more than one compound (U), as above detailed.

Among tri-substituted isocyanurate compounds (U-1) mention can be notably made of triallyl isocyanurate (otherwise referred to as "TAIC"), trivinyl isocyanurate, with TAIC being the most preferred.

Among tri-substituted cyanurate compounds (U-2) mention can be notably made of triallyl cyanurate, and trivinyl cyanurate.

Preferably, compound (U) is TAIC.

The amount of the compound (U) ranges normally from 2.5 to 15.0 weight parts per 100 parts by weight (phr) of fluoroelastomer (A), preferably from 3.0 to 12 weight parts per 100 parts by weight of fluoroelastomer (A), more preferably from 3.0 to 10 weight parts per 100 parts by weight of fluoroelastomer (A).

According to a first embodiment, the said at least one photoinitiator (P) is at least one photoinitiator [initiator (P-1)] of formula:

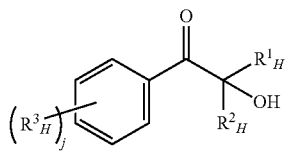

wherein:
$R^1{}_H$ and $R^2{}_H$, equal to or different from each other, are independently a methyl group or an ethyl group, preferably both are a methyl group;
each of $R^3{}_H$, equal to or different from each other, is a $C_1$-$C_{12}$ hydrocarbon group, containing possibly one or more than one heteroatom, in particular selected from the group consisting of oxygen, nitrogen, sulfur; and
j is zero or is an integer of 1 to 3, preferably it is zero,
said initiator (P-1) being present in an amount of 4.0 to 15.0 phr, based on fluoroelastomer (A).

Preferably, initiator (P-1) is a compound complying with formula above, wherein j is zero, and $R^1{}_H$ and $R^2{}_H$, i.e. is 2-hydroxy-2-methyl-1-phenyl-propan-1-one, which is notably commercially available under trade name DAROCUR® 1173, but which can be otherwise supplied from other sources According to a second embodiment, composition (C) comprises at least one photoinitiator [initiator (P-2)] of formula:

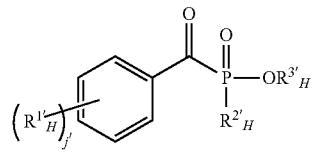

wherein:
each of $R^{1'}{}_H$, equal to or different from each other, is a $C_1$-$C_{12}$ hydrocarbon group, containing possibly one or more than one heteroatom, in particular selected from the group consisting of oxygen, nitrogen, sulfur;
$R^{2'}{}_H$ is a group selected from a methyl group, an ethyl group and a phenyl group;
$R^{3'}{}_H$ is a group selected from a methyl group and an ethyl group;
j' is zero or is an integer of 1 to 3, preferably it is zero, said initiator (P) being present in an amount of 4.0 to 15.0 phr, based on fluoroelastomer (A).

Preferably, initiator (P-2) is a compound complying with formula above, wherein j is 3, each of $R^{1'}{}_H$ is a methyl group, said $R^{1'}{}_H$ groups being positioned in the ortho position and in the para position with respect to the carbonyl group, $R^{2'}{}_H$ is phenyl and $R^{3'}{}_H$ is ethyl, i.e. is 2,4,6-trimethylbenzoylphenyl phosphinate, which is notably commercially available under trade name IRGACURE® TPO-L, but which can be otherwise supplied from other sources.

The amount of the initiator (P) ranges normally from 4.0 to 15.0 weight parts per 100 parts by weight (phr) of fluoroelastomer (A), preferably from 5.0 to 12.0 weight parts per 100 parts by weight of fluoroelastomer (A), more preferably from 6.0 to 10.0 weight parts per 100 parts by weight of fluoroelastomer (A). Very good results have been obtained when using an amount of about 9.0 phr of initiator (P), based on fluoroelastomer (A).

The composition (C) may further additionally comprise ingredients which maybe commonly used in curing of fluoroelastomers; more specifically, composition (C) may generally further comprise (a) one or more than one metallic basic compound, in amounts generally of from 0.5 to 15.0 phr, and preferably of from 1 to 10 phr, more preferably 1 to 5 phr, relative to 100 weight parts of fluoroelastomer (A); metallic basic compounds are generally selected from the group consisting of (j) oxides or hydroxides of divalent metals, for instance oxides or hydroxides of Mg, Zn, Ca or Pb, and (jj) metal salts of a weak acid, for instance Ba, Na, K, Pb, Ca stearates, benzoates, carbonates, oxalates or phosphites;

(b) one or more than one acid acceptor which is not a metallic basic compound, in amounts generally of from 0.5 to 15.0 phr, and preferably of from 1 to 10.0 phr, more preferably 1 to 5 phr, relative to 100 weight parts of fluoroelastomer (A); these acid acceptors are generally selected from nitrogen-containing organic compounds, such as 1,8-bis(dimethylamino)naphthalene, octadecylamine, etc., as notably described in EP 708797 A (DU PONT) 1 May 1996;

(c) other conventional additives, such as fillers, thickeners, pigments, antioxidants, stabilizers, processing aids/plasticizers, and the like. According to certain embodiments, the composition (C) may additionally comprise at least one organic solvent; suitable organic solvents are but not limiting to ketonic solvents such as acetone, methylethylketone; polar solvents such as acetonitrile, dimethylfrmamide (DMF), dimethylsulfoxide (DMSO), N-Methyl-2-pyrrolidone (NMP); esters such as ethyl acetate; ethers such as tetrahydrofuran, 1,4-dioxane etc. More preferable solvents are acetone, and methylethylketone.

According to certain other embodiments, the composition (C) may include at least one plasticizer (P), generally selected from those known for fluororubbers. Plasticizers (P) will be generally selected among ester-based plasticizers, such as glutarates (e.g. Diisodecyl glutarate), adipates (e.g. Bis(2-ethylhexyl)adipate, dimethyl adipate, monomethyl adipate, dioctyl adipate, Dibutoxyethoxyethyl adipate, Dibutoxyethyl adipate, Diisodecyl adipate), maleates (e.g. dibutyl maleate; diisobutyl maleate), azelates, sebacates (e.g. dibutyl sebacate, Di-2-ethylhexyl sebacate), trimellitates (e.g. tri-2-ethylhexyl trimellitate), citrates (e.g. triethyl citrate, tributyl citrate, acetyltriethylcitrate, acetyl tributyl citrate, trioctyl citrate, acetyl trioctyl citrate, trihexyl citrate, acetyl trihexyl citrate), phosphate esters (e.g. triethyl phosphate, tributyl phosphate, trioctyl phosphate).

The composition (C) may be prepared by any known mixing method. When the fluoroelastomer (A) is a high viscosity elastomer, kneading may be carried out with an internal mixer such as an open roll or kneader mixer; with low viscosity fluoroelastomer (A), mixing may be more effective when carried out in a planetary mixer, portable mixer, or the like. Further, when an organic solvent, as above detailed, is present, mixing can be accomplished through suitable mixing devices appropriate for liquid mixing, including any stirred container.

It is generally recommended for the composition (C) to be prepared under the condition that substantially no exposure to photo energy activating the initiator (P) may occur.

The invention also pertains to a method for fabricating shaped articles comprising curing the composition (C), as above described.

The composition (C) can be fabricated, e.g. by moulding (injection moulding, extrusion moulding), calendering, coating, screen-printing, forming-in-place, into the desired shaped article, which is advantageously subjected to vulcanization (curing) during the processing itself and/or in a subsequent step (post-treatment or post-cure), advantageously transforming the relatively soft, weak, fluoroelastomeric uncured composition into a finished article made of non-tacky, strong, insoluble, chemically and thermally resistant cured fluoroelastomer material.

The method of the invention comprises curing under exposure to UV radiation.

Suitable ultraviolet rays are those having a wavelength of from 420 to 150 nm, preferably of 400 to 200 nm. Generally, the wavelength spectrum of radiation used to effect the curing reaction will be selected to correspond to the absorption maximum of the UV initiator.

Suitable UV sources include medium pressure mercury lamps, electrodeless lamps, pulsed xenon lamps, hybrid xenon/mercury lamps, and light-emitting diodes (LEDs) designed to emit radiation in the ultraviolet range.

The radiation dosage is generally selected to be sufficient to cure the composition (C); dosage is generally dependent upon the distance of the composition (C) in its pre-shaped form from the UV source, the duration of the exposure, and the power level of the UV source.

The required radiation dose can be determined by one of ordinary skills in the art, according to routine experiments.

Generally, an acceptable degree of cure can be obtained by exposure during 30 to 1000 seconds, preferably 50 to 800 seconds, when using an UV source delivering an output power of about 800 W.

UV curing may be carried out at a temperature which generally does not exceed 100° C., preferably does not exceed 80° C., more preferably does not exceed 50° C.

As already explained, the ability of the composition (C) of delivering cured shaped articles under UV radiation, while avoiding the need of exposing the part to be cured at high temperatures is a particular beneficial effect of the present invention.

Yet, the invention pertains to cured articles obtained from the composition (C), as above detailed. Said cured articles are generally obtained by moulding and curing the fluoroelastomer composition, as above detailed. These cured articles may be sealing articles, including O(square)-rings, packings, gaskets, diaphragms, shaft seals, valve stem seals, piston rings, crankshaft seals, cam shaft seals, and oil seals or maybe piping and tubings, in particular flexible hoses or other items, including conduits for delivery of hydrocarbon fluids and fuels.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Raw Materials

TPO-L is ethyl (2,4,6-trimethylbenzoyl) phenylphosphinate, commercially supplied as OMNIRAD® TPO-L from IGM Resins, and used as received.

D-1173 is 2-hydroxy-2-methyl-1-phenyl-propan-1-one, which was supplied from Aldrich and used as received.

D-MBF is phenyl glyoxylic acid methyl ester (otherwise referred to as methyl benzoyl formate), which was supplied from Sigma Aldrich and used as received.

TAIC is triallylisocyanurate, commercially available as TAICROS® from Degussa and used as received.

Iodine-containing peroxide curable fluoroelastomer commercially available as TECNOFLON® P 457 from Solvay Specialty Polymers Italy S.p.A. was used; it will be referred to as (A-2), hereunder.

EXAMPLES

Preparative Example 1—Manufacture of Fluoroelastomer (A-1)

In a 10 liters reactor equipped with a mechanical stirrer operating at 545 rpm, 5.4 l of demineralized water and 40 ml of a microemulsion, previously obtained by mixing 8.8 ml of a perfluoropolyoxyalkylene having acidic end groups of formula: $CF_2ClO(CF_2-CF(CF_3)O)_n(CF_2O)_mCF_2COOH$, wherein n/m=10, having average molecular weight of 600, 5.6 ml of a 30% v/v $NH_4OH$ aqueous solution, 20.0 ml of demineralized water and 5.5 ml of GALDEN® D02 perfluoropolyether of formula: $CF_3O(CF_2CF(CF_3)O)_n(CF_2O)_mCF_3$ with n/m=20, having average molecular weight of 450, were introduced. The reactor was heated and maintained at a set-point temperature of 80° C. A mixture of tetrafluoroethylene (TFE) (11% moles), vinylidene fluoride (VDF) (70% moles) and hexafluoropropylene (HFP) (19% moles) was then added to reach a final pressure of 30 bar (3.0 MPa). 54 ml of 1,4-diiodoperfluorobutane ($C_4F_8I_2$) as chain transfer agent and 1.8 g of ammonium persulfate (APS) as initiator were then introduced. Pressure was maintained at set-point of 30 bar by continuous feeding of a gaseous mixture of TFE (11% moles), VDF (70% moles) and HFP (19% moles) up to a total of 3150 g. Then the reactor was cooled, vented and the latex recovered. The polymer was recovered drying the latex in a rotatory evaporator under vacuum until complete removal of the liquid phase.

A fluoroelastomer was so recovered having the following molar composition: TFE: 12.0% moles; VDF: 70.5% moles; HFP: 17.5% moles, comprising 2.3% wt of iodine. This fluoroelastomer, when analyzed by GPC, by dissolving a sample thereof at about 0.5% wt/vol concentration in tetrahydrofurane for 6 hours under magnetic stirring at room temperature; the solution so obtained was filtered over a PTFE filter having 0.45 μm pore size and the filtered solution was injected in the GPC system; details of the GPC conditions are listed hereinafter:

Mobile phase Tetrahydrofuran; Flow rate 1.0 mL/min; Temperature 35° C.; Injection system Autosampler model 717 plus; Injection volume 200 μl; Pump Isocratic Pump model 515; Column set: Precolumn+4 Waters Styragel HR: $10^6$, $10^5$, $10^4$ and $10^3$ Å; DetectorWaters Refractive Index model 2414; Software for data acquisition and processing: Waters Empower 3. The fluoroelastomer was found to possess a $M_n$ of 12 398, a $M_w$ of 23 355, and a polydispersity index of 1.9; substantially no fraction was found having a molecular weight of below 1 000.

The Mooney Viscosity measured at 121° C. (1+10 min) according to ASTM D1646 provided non-measurable values, more precisely values below the detection limit of the instrument, demonstrating the very low viscosity as related to the molecular weight.

Compounding and Crosslinking Procedure

Fluoroelastomer of Preparative Example 1 was compounded with the additives, as specified in Tables below, according to the procedure below detailed.

General procedure of final sheet preparation for characterization includes: mixing of polymer with curing agent and initiator of curing till full homogenization. Mixing was performed by manula mixing, or in a speedmixer or in a stirred receptacle in a solvent.

In particular, when the composition comprised a solvent, in 100 ml glass Becker, equipped with magnetic stirrer, the ingredients were introduced according to the following procedure: the fluoroelastomer was dissolved in the solvent at 40° C., and stirred at 600 rpm until complete dissolution of fluoroelastomer; multifunctional compound and photoinitiator were then added and homogenization of the blend was pursued during 5 minutes. The composition was then poured on a petri dish and dried in static oven at 40° C. in order for removing solvent. Dried compound was then cured by ultraviolet irradiation.

When the composition did not comprise any solvent, SpeedMixer™ bladeless centrifugal mixer equipment, model DAC400 FVZ, purchased from company FlackTek Inc was used. All ingredients of the composition (fluoroelastomer; multifunctional compound and photoinitiator) were introduced in a 300 ml polypropylene jar and mixed by SpeedMixer device till full homogenization. Then composition was poured on a petri dish and cured by ultraviolet irradiation.

Ultraviolet Irradiation Conditions

UV curing was carried-out in UV curing device, called "Curing test" of Helios Italquartz S.r.l. "Curing test" equipped with UV lamp HMPL. HMPL is MEDIUM PRESSURE MERCURY VAPOUR LAMP which emits across the entire spectrum of ultraviolet light (UVA, UVB and UVC) with peak emission in the UVA range at 366 nm.

In order to cure the compound, the specimen was placed inside of "Curing test" and exposed to irradiation in nitrogen environment. $N_2$ was fed at constant flux at 0.5 bar. Irradiation cycle lasted 9 minutes. The sample temperature was controlled to avoid heating beyond 50° C. The device was employed at 100% of power irradiation (800 Watt).

After UV irradiation, cured sample could be post-cured (PC). PC for the samples cured by UV included thermal treatment in static for 48 hours at 50° C.

In tables below, amounts of ingredients are provided as weight parts, on the basis of 100 weight parts of fluororubber base.

Mechanical Properties Determination on Cured Samples

The tensile properties have been determined on specimens punched out from the piled films, according to the ASTM D638 Type V Standard.

$M_{100}$ is the tensile strength in MPa at an elongation of 100%;

TS is the tensile strength in MPa;

EB is the elongation at break in %.

The Shore A hardness (3") (HDS) has been determined on 3 pieces of plaque piled according to the ASTM D 2240 method.

Crosslinking Efficiency Assessment

The specimen is immersed into MEK in a closed glass vessel (ratio 1 g of polymer in 50 mL of MEK), at room temperature for 16 hours (overnight) without stirring. Suitable polymer amount for test is 2 g.

After the immersion the sample is dried in an oven at 110° C. for 4 hours under vacuum. The drying process is needed to evaporate the absorbed liquid and to determine if a partial dissolution of the sample has occurred. Crosslinking efficiency is then determined as insoluble percentage of the specimen as percent weight ratio between final weight and initial weight of specimen.

TABLE 1

| Composition | Ex. 1C | Ex. 2C | Ex. 3 | Ex. 4 | Ex. 5 | Ex. 6C | Ex. 7 |
|---|---|---|---|---|---|---|---|
| (A-1) | 100 | 100 | 100 | 100 | 100 | 100 | |
| (A-2) | | | | | | | 100 |
| D-1173 | 9 | 9 | 9 | 9 | 9 | 18 | 9 |
| TAIC | 0.7 | 1.1 | 3.0 | 7.5 | 9 | 18 | 9 |
| Solvent | | | | Ethyl acetate[1] | | | EFX[2] |
| Characterizations | | | | | | | |
| XL after UV (%) | 0% | 56% | 86% | 88% | 91% | 86%* | 91% |
| XL after PC (%) | | 73% | 87% | 93% | 96% | n.d. | |
| TS (MPa) | n.d. - | 3.3 | 5 | 5.8 | 5.3 | 7.1 | 5.6 |

TABLE 1-continued

| Composition | Ex. 1C | Ex. 2C | Ex. 3 | Ex. 4 | Ex. 5 | Ex. 6C | Ex. 7 |
|---|---|---|---|---|---|---|---|
| M$_{100}$ (MPa) | not cured | 4 | 4 | 5 | 5 | 9 | |
| EB (%) | | 603 | 269 | 158 | 143 | 74 | 42 |
| Hardness (Shore A) | | 38 | 50 | n.d. | 53 | n.d. | |

*very dark cured specimen, mechanical properties not suitable for use as fluororubber;
[1]composition prepared via solution method using ethyl acetate as solvent;
[2]composition prepared via solution method using EFX solvent.

TABLE 2

| Composition | Ex. 8 | Ex. 9C | Ex. 10C | Ex. 11C | Ex. 12C | Ex. 13 |
|---|---|---|---|---|---|---|
| (A-1) | 100 | 100 | 100 | 100 | 100 | 100 |
| D-1173 | 6.5 | 3.1 | 1.1 | 2.5 | | |
| D-MBF | | | | | 9.0 | |
| TPO-L | | | | | | 9.0 |
| TAIC | 9.0 | 9.0 | 9.0 | 2.5 | 9.0 | 9.0 |
| Solvent | Ethyl acetate[1] | | | | | |
| Characterizations | | | | | | |
| XL after UV (%) | 87% | 84% | n.d. | 81% | No cure | 85% |
| XL after PC (%) | 95% | 90% | n.d. | 84% | | 85% |
| TS (MPa) | 6.4 | 4.1 | 3.9 | 2.4 | | 8.3 |
| M$_{100}$ (MPa) | 5 | 4 | 3 | 2 | | 5 |
| EB (%) | 150 | 135 | 162 | 226 | | 170 |
| Hardness (Shore A) | 60 | 47 | 46 | 39 | | n.d. |

[1]composition prepared via solution method using ethyl acetate as solvent

As comparison, a cured specimen was prepared by standard compounding (see Ex. 14C) using same fluoroelastomer raw gum, but adding traditional peroxide curing ingredients and molding for 10 minutes at 170° C., followed by post-curing 4 h at 230° C.; results shown below demonstrate that low temperature UV curing of composition of the invention leads to substantially similar product performances.

TABLE 3

| Composition | Ex. 14C[1] | Ex. 15[3] |
|---|---|---|
| (A-1) | 100 | 100 |
| D-1173 | | 9.0 |
| Peroxide[2] | 4.05 | |
| TAIC | 9.0 | 9.0 |
| XL after UV (%) | n.a. | 86% |
| XL after PC (%) | 98% | n.d. |
| TS (MPa) | 6.5 | n.d. |
| M$_{100}$ (MPa) | 6 | n.d. |
| EB (%) | 118 | 117 |
| Hardness (Shore A) | 58 | 43 |

[1]composition prepared in the absence of solvent in SpeedMixer;
[2]Luperox ® 101, 2,5-Bis(tert-butylperoxy)-2,5-dimethylhexane;
[3]composition prepared by mixing manually, in the absence of solvent, and UV cured and post-cured according to the procedure described above.

The invention claimed is:

1. A composition (C) comprising:
   at least one fluroelastomer (A), wherein fluoroelastomer (A) is a (per)fluoroelastomer comprising iodine cure sites in an amount such that iodine content is in a range from 0.04 to 10.0% wt, with respect to the total weight of fluoroelastomer (A);
   at least one initiator (P), wherein initiator (P) is a photoinitiator of formula:

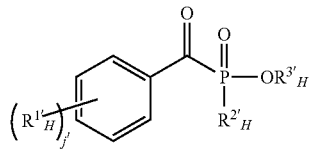

wherein:
   each of $R^{1'}_H$, equal to or different from each other, is a $C_1$-$C_{12}$ hydrocarbon group, optionally containing one or more than one heteroatom, selected from the group consisting of oxygen, nitrogen, and sulfur;
   j' is zero;
   $R^{2'}_H$ is a phenyl, a methyl group or an ethyl group;
   $R^{3'}_H$ is selected from a methyl group and an ethyl group;
said initiator (P) being present in an amount of 4.0 to 15.0 phr, based on fluoroelastomer (A); and
   at least one compound (U), wherein compound (U) is a polyunsaturated compound selected from:
(U-1) tri-substituted isocyanurate compounds of general formula:

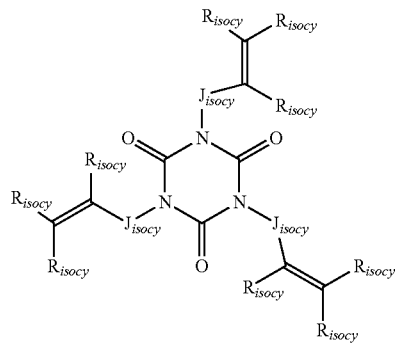

wherein each of $R_{isocy}$, equal to or different from each other and at each occurrence, is independently selected from H or a group —$R_{risocy}$ or —$OR_{risocy}$, with $R_{risocy}$ being $C_1$-$C_5$ alkyl, optionally comprising halogen(s), and each of $J_{isocy}$, equal to or different from each other and at each occurrence, is independently selected from a bond or a divalent hydrocarbon group, optionally comprising heteroatoms, and (U-2) tri-substituted cyanurate compounds of general formula:

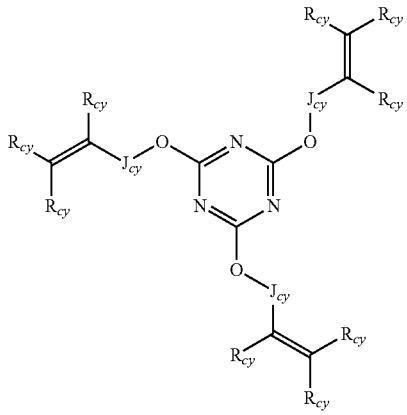

wherein each of $R_{cy}$, equal to or different from each other and at each occurrence, is independently selected from H or a group $-R_{rcy}$ or $-OR_{rcy}$, with $R_{rcy}$ being $C_1$-$C_5$ alkyl, optionally comprising halogen(s), and each of $J_{cy}$, equal to or different from each other and at each occurrence, is independently selected from a bond or a divalent hydrocarbon group, optionally comprising heteroatoms;
said compound (U) being present in an amount of 2.5 to 15.0 phr, based on fluoroelastomer (A).

2. The composition (C) of claim 1 wherein said at least one photoinitiator (P) is at least one initiator (P-1), wherein initiator (P-1) is a photoinitiator of formula:

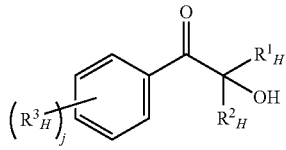

wherein:
$R^1_H$ and $R^2_H$, equal to or different from each other, are independently a methyl group or an ethyl group;
each of $R^3_H$, equal to or different from each other, is a $C_1$-$C_{12}$ hydrocarbon group, optionally containing one or more than one heteroatom selected from the group consisting of oxygen, nitrogen, and sulfur; and
j is zero or is an integer of 1 to 3,
said initiator (P-1) being present in an amount of 4.0 to 15.0 phr, based on fluoroelastomer (A).

3. The composition (C) of claim 2, wherein
$R^1_H$ and $R^2_H$ are each a methyl group; and
j is zero.

4. The composition (C) of claim 1, wherein said fluoroelastomer (A) comprises recurring units derived from at least one (per)fluorinated monomer, wherein said (per)fluorinated monomer is selected from the group consisting of:
$C_2$-$C_8$ fluoro- and/or perfluoroolefins;
$C_2$-$C_8$ hydrogenated monofluoroolefins;
1,2-difluoroethylene, vinylidene fluoride (VDF) and trifluoroethylene (TrFE);
(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;
chloro- and/or bromo- and/or iodo-$C_2$-$C_6$ fluoroolefins;
fluoroalkylvinylethers complying with formula $CF_2=CFOR_{f1}$ in which $R_{f1}$ is a $C_1$-$C_6$ fluoro- or perfluoroalkyl;
hydrofluoroalkylvinylethers complying with formula $CH_2=CFOR_{f1}$ in which $R_{f1}$ is a $C_1$-$C_6$ fluoro- or perfluoroalkyl;
fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups;
functional fluoro-alkylvinylethers complying with formula $CF_2=CFOY_0$, in which $Y_0$ is a $C_1$-$C_{12}$ alkyl or (per)fluoroalkyl, a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;
(per)fluorodioxoles, of formula:

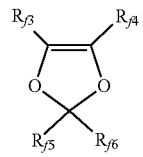

wherein
each of $R_{f3}$, $R_{f4}$, $R_{f5}$, $R_{f6}$, equal to or different from each other, is independently a fluorine atom, a $C_1$-$C_6$ fluoro- or per(halo)fluoroalkyl, optionally comprising one or more oxygen atom.

5. The composition (C) of claim 4, wherein said fluoroelastomer (A) is selected from:
(1) VDF-based copolymers, in which VDF is copolymerized with at least one additional comonomer selected from the group consisting of:
(a) $C_2$-$C_8$ perfluoroolefins;
(b) hydrogen-containing $C_2$-$C_8$ fluorinated olefins;
(c) $C_2$-$C_8$ fluoroolefins comprising at least one of iodine, chlorine and bromine;
(d) (per)fluoroalkylvinylethers (PAVE) of formula $CF_2=CFOR_f$, wherein $R_f$ is a $C_1$-$C_6$ (per)fluoroalkyl group;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms;
(f) (per)fluorodioxoles having formula:

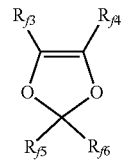

wherein each of $R_{f3}$, $R_{f4}$, $R_{f5}$, $R_{f6}$, equal to or different from each other, is independently selected from the group consisting of fluorine atom and $C_1$-$C_6$ (per)fluoroalkyl groups, optionally comprising one or more than one oxygen atom;
(g) (per)fluoro-methoxy-vinylethers having formula:
$CF_2=CFOCF_2OR_{f2}$ wherein $R_{f2}$ is selected from the group consisting of $C_1$-$C_6$ (per)fluoroalkyls; $C_5$-$C_6$ cyclic (per)fluoroalkyls; and $C_2$-$C_6$ (per)fluorooxyalkyls, comprising at least one catenary oxygen atom;

(h) $C_2$-$C_8$ non-fluorinated olefins (Ol); and (2) TFE-based copolymers, in which TFE is copolymerized with at least one additional comonomer selected from the group consisting of (c), (d), (e), (g), (h) and (i) as above detailed.

6. The composition (C) according to claim 1, wherein compound (U) is selected from the group consisting of triallyl isocyanurate and trivinyl isocyanurate.

7. The composition according to claim 1, wherein the amount of the compound (U) ranges from 0.1 to 20 weight parts per 100 parts by weight (phr) of fluoroelastomer (A).

8. The composition according to claim 7, wherein the amount of the compound (U) ranges from 1 to 15 weight parts per 100 parts by weight of fluoroelastomer (A).

9. The composition according to claim 8, wherein the amount of the compound (U) ranges from 1 to 10 weight parts per 100 parts by weight of fluoroelastomer (A).

10. The composition (C) according to claim 1, said composition additionally comprising at least one organic solvent.

11. The composition (C) according to claim 10, wherein the at least one organic solvent is selected from the group consisting of ketonic solvents, polar solvents, esters, ethers and mixtures thereof.

12. The composition (C) according to claim 1, wherein the composition (C) includes at least one plasticizer (P).

13. The composition (C) according to claim 12, wherein the at least one plasticizer (P) comprises one or more ester-based plasticizers, wherein the one or more ester-based plasticizers is selected from the group consisting of glutarates, adipates, maleates, azelates, sebacates, trimellitates, citrates, phosphate esters, and mixtures thereof.

14. A method for fabricating shaped articles comprising curing the composition (C), according to claim 1.

* * * * *